(No Model.) 3 Sheets—Sheet 2.
H. R. FAY.
VALVE GEAR.
No. 375,927. Patented Jan. 3, 1888.
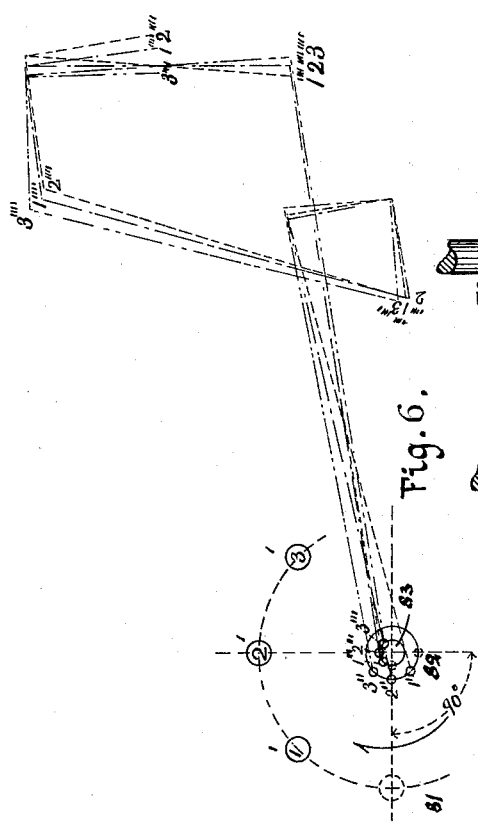
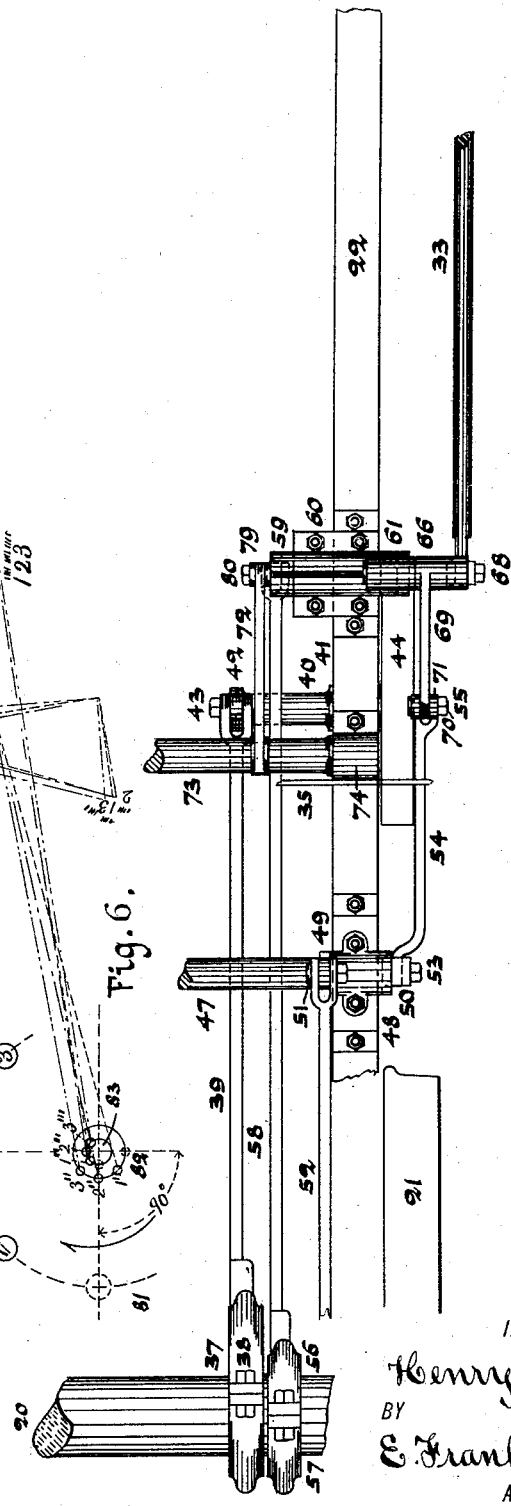
WITNESSES:
Jos H. Shepherd
Jacob Naschold
INVENTOR
Henry R. Fay.
BY
E. Frank Woodbury.
ATTORNEY (No Model.)　　　　　　　　H. R. FAY.　　　　　3 Sheets—Sheet 3.
VALVE GEAR.
No. 375,927.　　　　　　　　　　　　Patented Jan. 3, 1888.
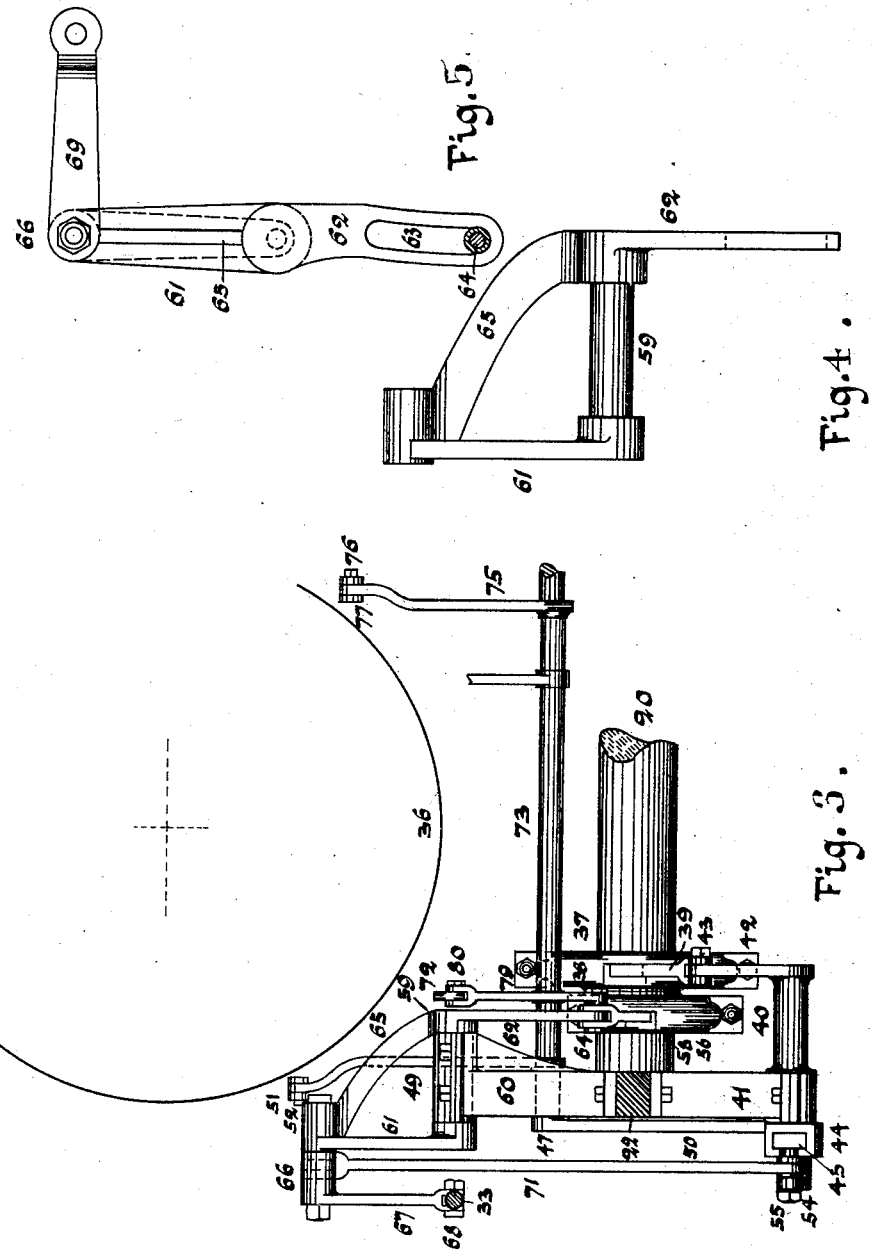
WITNESSES:　　　　　　　　　　　　　　　　　INVENTOR
Jos H. Shepherd　　　　　　　　　　　　　　Henry R. Fay.
Jacob Naschold　　　　　　　　　　　　　BY
　　　　　　　　　　　　　　　　　　　E. Frank Woodbury.
　　　　　　　　　　　　　　　　　　　　　　　ATTORNEY

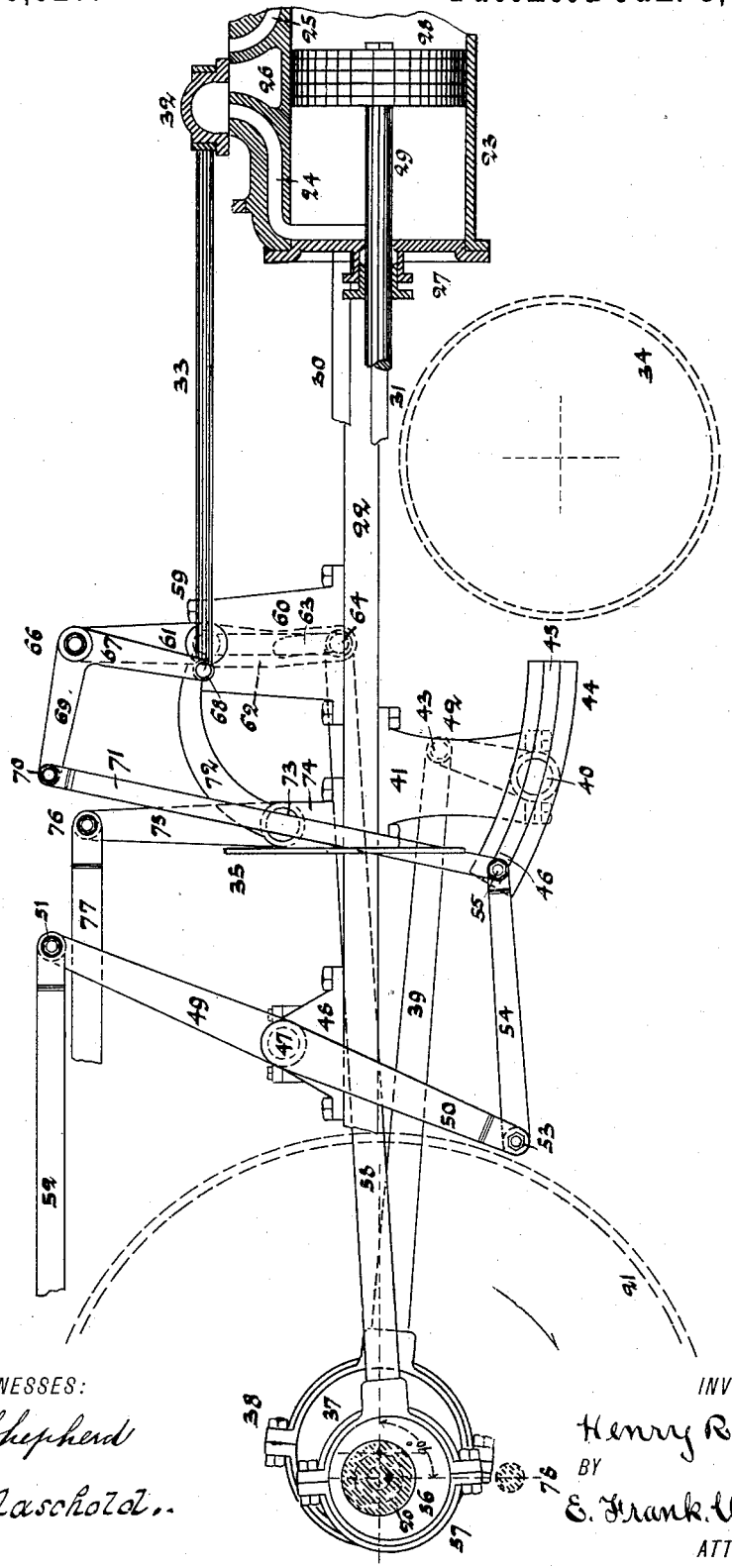

UNITED STATES PATENT OFFICE.

HENRY R. FAY, OF BOSTON, MASSACHUSETTS.

VALVE-GEAR.

SPECIFICATION forming part of Letters Patent No. 375,927, dated January 3, 1888.

Application filed February 28, 1887. Serial No. 229,227. (No model.)

*To all whom it may concern:*

Be it known that I, HENRY R. FAY, of Boston, in the county of Suffolk and State of Massachusetts, have invented certain new and useful Improvements in Valve-Gears, of which the following, taken in connection with the accompanying drawings, is a specification.

My invention relates to valve-gear designed for use upon engines of any class. I will, however, illustrate it as applied to locomotives.

My invention has for its object the construction and arrangement of valve-gear mechanism so applied as to obtain in its use when operating a locomotive-cylinder single valve, whether of piston or slide in form, balanced, partially balanced, or not balanced in arrangement, in such a manner as to afford an independent adjustable lead and cut-off device of such a character as will permit the more economical and efficient use of steam, and will also permit the operating of a locomotive ahead or back with exactly the same efficiency, except what may be due to the slight angularity of the valve-gear motions.

Figure 1 represents valve-gear in side elevation in full gear ahead as applied to one side of a locomotive, with main crank-pin at lower quarter, showing the main driving-axle in section, part of one side of the frame, a sectional view of the cylinder and valve, and a view of other parts of a locomotive requisite to define relative position of valve-gear. Fig. 2 represents my valve-gear in plan in mid-gear as applied to one side of a locomotive, showing a portion of main driving-axle, main driving-wheel, frame, valve stem, and a view of other parts necessary to correctly locate valve-gear. Fig. 3 is a front elevation of Fig. 2, with the yoke left out and with located diameter of boiler in partial outline so as to more completely locate valve-gear. Fig. 4 is a front elevation of rocker-shaft; and Fig. 5 is a rear elevation of Fig. 4, with bell-crank attached to rocker-shaft. Fig. 6 illustrates valve-gear motion obtained during the movement of main crank-pin from back dead-center point through one hundred and thirty-five degrees its revolution by forty-five degree points. Fig. 7 illustrates the valve movement as obtained by valve-gear motion illustrated by Fig. 6.

The main driving-axle 20, main driver 21, (represented by dotted lines,) frame 22, cylinder 23, provided with supply-ports 24 and 25 and exhaust-port 26, cylinder-head 27, provided with stuffing-box, piston 28, piston-rod 29, cross-head slides 30 and 31, slide-valve 32, valve-stem 33, truck-wheel 34, (represented by dotted lines,) yoke 35, and diameter outline of boiler 36, (represented by full line in Fig. 3,) are all of a common style of construction and arrangement and are of the ordinary design.

The eccentric 37 is fastened to main driving-axle 20, and is provided with the eccentric-straps 38, to which is fastened the eccentric-rod 39. The link rocker-shaft 40 is mounted in bearing-support 41, which is bolted to frame 22. The link rocker-shaft arm 42 is connected with eccentric-rod 39 by means of pin 43. The link 44, which is secured to link rocker-shaft, is provided with the way 45, in which the link-block 46 is free to slide, in the usual manner of links of this class.

The reverse-shaft 47, mounted in bearing of support 46, which is bolted to frame, is provided with two arms, 49 and 50. The arm 49 is connected by means of pin 51 to reverse-rod 52, which extends into the cab of the locomotive, and is arranged and adapted to operate in the usual manner. The arm 50 is connected to link-block 46 by means of pin 53, rod 54, and pin 55. The adjustable lead and cut-off eccentric 56, fastened to main driving-axle 20, is provided with eccentric-straps 57, to which is secured the eccentric-rod 58.

The rocker-shaft 59 is mounted in bearing in support 60, which is bolted to frame, and is provided with the arms 61 and 62. The radial slot 63 in arm 62 has fitted to it the pin 64, which is free to slide or is adjustable within the length of slot, and by means of which the eccentric-rod is connected to and operates the rocker-shaft. The rocker-shaft arm 61, which is strengthened by means of web 65, is provided with the bearing in which is mounted the bell-crank 66. The arm 67 of bell-crank is connected with valve-stem 33 by means of pin 68. The arm 69 of bell-crank is connected with link-block 46 by means of pin 70, rod 71, and pin 55.

To the pin 64 of the rocker-shaft arm 62 is connected, by means of rod 79 and pin 80, the arm 72 of the adjustable lead and cut-off shaft 73, which is mounted in bearing in support 74, which is bolted to frame. To the arm 75 is attached, by means of pin 76, the adjustable lead and cut-off rod 77, which extends into the cab of the locomotive, and is designed to be constructed and arranged to operate in a similar manner to reverse-rod mechanism.

The action of eccentrics is as follows, illustrated in Fig. 1, main crank-pin 78, represented by dotted section: The center of link rocker-shaft eccentric 37 is about ninety degrees back of main crank-pin 78, and the center of lead and cut-off eccentric is in the same radial line, or about the same, as main crank-pin 78. When the valve-gear is in mid-gear, the center lines of the following parts are in the following positions, or nearly so. Reverse shaft arms 49 and 50, rod 71, link rocker-shaft arm 42, radial center line of link 44, bell-crank arm 67, lead and cut-off shaft arm 75 are vertical, or nearly so. Reverse-rod 52, rod 54, bell-crank arm 69, and lead and cut-off rod 77 are horizontal, or nearly so, and rocker-shaft arms 61 and 62 and rod 79 are oblique from vertical center line through rocker-shaft 59.

All the parts being made of the material and strength requisite for their respective duties, and being suitably located and connected with the locomotive, as shown in the drawings, and the bell-crank arm 67 being correctly connected with the valve 32, and the throws of link rocker-shaft eccentric and lead and cut-off eccentric being correctly proportioned, in order to give, by means of suitably-constructed connecting parts, as shown and described, the requisite throw of the slide-valve, the operation of my devices, as illustrated by Figs. 6 and 7, is as follows: The main crank-pin, link rocker-shaft eccentric, and lead and cut-off eccentric being set as previously described, the throws of which are respectively designated by circles 81, 82, and 83, and the movement of the crank-pin and eccentrics, through one hundred and thirty-five degrees by forty-five degree points, being marked on said circles as follows, respectively, 1' 2' 3', 1" 2" 3", and 1''' 2''' 3''', the valve-gear motions at different points, as shown, being marked, respectively, 1'''' 2'''' 3'''', the movements of the valve 32 are illustrated by dotted lines 1''''', 2''''', and 3''''', the valve itself being shown in section in its position where the main crank-pin and eccentrics are set, as previously described, with main crank-pin on back dead-center.

In operation many advantages are afforded by my device. By the placing of radial center line of link at right angles, or nearly so, with the center line of adjustable lead and cut-off eccentric-rod motion I am able to operate the locomotive back or ahead in quite nearly an equally efficient manner, and by means of the lead and cut-off device I am able to operate a locomotive in the most efficient manner under different speeds, having complete control of the amount of lead and cut-off of the valve, and by reason of the center of eccentric 37 being placed one-quarter back of center of main crank-pin 78 the greatest speed of the eccentric motion is developed in the opening and in the closing movements of the slide-valve.

One of the greatest advantages is that while obtaining the control of the valve motions as desired, the valve-gear is extremely simple in its construction, very strong and durable, and has few parts.

What I claim as my invention, and desire to secure by Letters Patent, is—

1. In a valve-gear, the combination of the rocker-shaft 59, provided with arms 61 and 62, with eccentric 56, valve-stem 33, link 44, eccentric 37, bell-crank 66, and rod 71, substantially as and for the purposes set forth.

2. The combination of devices, substantially as described, for operating a single valve, said devices being composed of the following elements: eccentric 37, link 44, connected with valve by means of valve-stem 33, bell-crank 66, and rod 71, the center radial line of link being at right angles, or nearly so, to axial line of valve-stem, and bell-crank 66, oscillated by rocker shaft 59, which oscillation is produced by connection, substantially as shown, with eccentric 56.

3. The combination of devices, substantially as and for the purposes set forth, by means of which an independent variable lead and cut-off valve motion may be obtained, said devices being composed of the following elements: rocker-shaft 59, provided with arms 61 and 62, arm 62 being provided with slot 63, eccentric 56, and connected with valve by means of valve-stem 33 and bell-crank 66, and rocker-shaft-arm pin 64, operated by means of adjustable lead and cut-off shaft mechanism, and as said pin in operation is drawn toward the center of rocker-shaft 59 the travel of the valve is increased, and vice versa, when pin is pushed from the center of rocker-shaft the travel of the valve is decreased, thereby permitting independent variable lead and cut-off valve motions.

4. The combination of devices, substantially as and for the purposes set forth, by means of which equally efficient, or nearly so, valve motions may be obtained in either forward or back gear, said devices being composed of the following elements: eccentric 56, rocker-shaft 59, connected with valve by means of valve-stem 33 and bell-crank 66, eccentric 37, link 44, connected with valve by means of valve-stem 33, bell-crank 66, and rod 71, said devices being placed, as shown, so that the center radial line of link 44 will be at right angles, or nearly so, with center line of adjustable lead and cut-off eccentric-rod motion.

In testimony whereof I have signed my name to this specification, in the presence of two subscribing witnesses, on this 25th day of February, A. D. 1887.

HENRY R. FAY.

Witnesses:
E. FRANK WOODBURY,
JOS. H. SHEPHERD.